United States Patent [19]

Sawada et al.

[11] Patent Number: 5,625,517
[45] Date of Patent: *Apr. 29, 1997

[54] APPARATUS FOR READING AND/OR DISPLAYING INFORMATION OBTAINED FROM A MEMORY DEVICE OR A TERMINAL BOARD DEVICE OF A RECORDING MEDIUM CASSETTE

[75] Inventors: Takashi Sawada; Hiroshi Okada; Chiaki Sugai, all of Kanagawa, Japan

[73] Assignee: Sony Corporation, Tokyo, Japan

[*] Notice: The term of this patent shall not extend beyond the expiration date of Pat. No. 5,434,721.

[21] Appl. No.: 390,825

[22] Filed: Feb. 17, 1995

Related U.S. Application Data

[63] Continuation of Ser. No. 103,558, Aug. 9, 1993, abandoned.

[30] Foreign Application Priority Data

Aug. 14, 1992 [JP] Japan ................................. 4-237618

[51] Int. Cl.⁶ ................................................ G11B 23/34
[52] U.S. Cl. ................................................ 360/137; 360/69
[58] Field of Search ................................ 360/137, 132, 360/69, 71

[56] References Cited

U.S. PATENT DOCUMENTS

| | | | |
|---|---|---|---|
| 4,383,285 | 5/1983 | Staar | 360/137 |
| 4,426,684 | 1/1984 | Sechet et al. | 364/900 |
| 4,593,337 | 6/1986 | Leone et al. | 360/132 |
| 4,789,973 | 12/1988 | Mabuchi | 360/137 |
| 5,031,058 | 7/1991 | Shiba et al. | 360/96.5 |
| 5,239,427 | 8/1993 | Ooka et al. | 360/96.5 |
| 5,434,721 | 7/1995 | Sawada et al. | 360/132 |

FOREIGN PATENT DOCUMENTS

| | | |
|---|---|---|
| 886249 | 3/1981 | Belgium . |
| 3139281 | 4/1983 | Germany . |
| 4200436 | 7/1993 | Germany ............... 360/137 |
| 62-73479 | 4/1987 | Japan . |
| 63-13187 | 1/1988 | Japan . |
| 2043982 | 10/1980 | United Kingdom . |
| WO89/10615 | 11/1989 | WIPO . |
| WO93/04473 | 3/1993 | WIPO . |

*Primary Examiner*—Stuart S. Levy
*Assistant Examiner*—Kevin M. Watkins
*Attorney, Agent, or Firm*—William S. Frommer; Alvin Sinderbrand

[57] ABSTRACT

A display apparatus connected to a recording medium cassette having a recording medium, a cassette case for accommodating the recording medium, a storage device for storing recording information recorded on the recording medium and information about the cassette itself, and a plurality of terminals for connecting the storage device to external equipment. This display apparatus comprises a loading portion for loading the recording medium cassette, a connector provided on the loading portion to be connected with the plurality of terminals, a reading device for reading the information from the storage device through the connector, and a display device for displaying the information read by the reading device. Simply connecting the plurality of terminals of the recording medium cassette to the connector of the recording/reproducing apparatus allows display of the recording information about the recording medium cassette, thus providing recorded contents of the recording medium cassette quickly and easily as well as facilitating retrieval and management of the recorded contents.

11 Claims, 13 Drawing Sheets

APPARATUS FOR READING AND/OR DISPLAYING INFORMATION OBTAINED FROM A MEMORY DEVICE OR A TERMINAL BOARD DEVICE OF A RECORDING MEDIUM CASSETTE

This application is a continuation of application Ser. No. 08/103,558, filed Aug. 9, 1993 (now abandoned).

BACKGROUND OF THE INVENTION

1. Field of the Invention

The present invention relates to a digital signal recording medium cassette for use on a video tape recorder (hereinafter referred to as VTR) or a video cassette recorder (hereinafter referred to as VCR), a recording/reproducing apparatus to be connected thereto, and a remote commander apparatus to be connected thereto. More specifically, the present invention relates to a recording medium cassette, a recording/reproducing apparatus to be connected thereto, and a remote commander apparatus to be connected thereto, each capable of displaying specific pieces of information about the recording medium cassette.

2. Description of the Prior Art

As is known, specific pieces of information about a recording medium cassette for use on a VTR or VCR including the length, type, grade, and available remaining capacity of a tape accommodated in the cassette, whether the tape is recorded or blank, and whether the tape is a rental video tape or not are necessary for protecting recorded data from destruction, ensuring proper recording, and recording the number of dubbing times to prevent illegal use.

Accordingly, these specific pieces of information are written beforehand in a specific area of the tape, such as a subcode area. When recording or reproduction of a cassette tape has been completed or when it has been unloaded from a VTR or a VCR, the written information is changed or a new piece of information is added to it. Some recording medium cassettes are provided with recognition holes for reading these pieces of information, on the back of their body generally at lower right and left corners.

Recognition as referred to herein denotes a function provided by bottom side b of recording medium cassette A as shown in FIG. 17 for example. A plurality of recognition holes c formed on the bottom side b in each lower corner thereof represent the type, quality, and other information about the recording medium cassette A.

The plurality of recognition holes c are each assigned with a specific piece of information to be displayed. For example, one of recognition holes c represents a magnetic tape type while another represents a magnetic tape thickness.

When the recording medium cassette A is loaded into a recording/reproducing apparatus, a pin of a detection switch provided on the apparatus gets into a corresponding recognition hole c to detect a piece of information assigned thereto based on a depth thereof. In FIG. 17, indicated by d is a cassette positioning hole.

In another approach, specific pieces of information about a recording medium cassette including its magnetic tape type, whether it has been recorded or blank, and whether it is a rental video cassette or not are stored beforehand in a memory device provided on the cassette having no above-mentioned recognition holes. This proposition is found in: U.S. Pat. No. 4,338,644 Jul. 6, 1982, Theophiel C. J. L. Starr; U.S. Pat. No. 4,383,285 May 10, 1983, Theophiel C. J. L. Starr; U.S. Pat. No. 4,426,684 Jan. 17, 1984, Claude Sechet, et al.; and U.S. Pat. No. 4,839,875 Jun. 13, 1989, Zenkichi Kuriyama, et al.

The problem with the above-mentioned prior art techniques is that the information recorded on the recording medium cassette cannot be known before it has been set in a recording/reproducing apparatus and the magnetic tape of the cassette has been fully loaded in the apparatus, making it extremely difficult to check or manage the informational content of a lot of cassettes in a short time after such an activity is initiated.

Accordingly, some means are required so that the recording information can be known at least before the cassette is loaded in the recording/reproducing apparatus.

SUMMARY OF THE INVENTION

It is therefore an object of the present invention to provide a digital signal recording medium cassette for use on a video tape recorder (hereinafter referred to as VTR) or a video cassette recorder (hereinafter referred to as VCR), a recording/reproducing apparatus to be connected thereto, and a remote commander apparatus to be connected thereto. More specifically, the present invention provides a recording medium cassette, a recording/reproducing apparatus to be connected thereto, and a remote commander apparatus to be connected thereto, each capable of displaying specific pieces of information about the recording medium cassette.

In carrying out the invention and according to one aspect thereof, there is provided a display apparatus to be connected to a recording medium cassette having a recording medium, a cassette case for accommodating the recording medium, storage means for storing information about data recorded on the recording medium and information about the cassette itself, and a plurality of terminals for connecting the display apparatus with external equipment, the display apparatus comprising a loading portion in which the recording medium cassette is loaded, a connector provided on the loading portion to be connected with the plurality of terminals, reading means for reading the information from the storage means via the connector, and display means for displaying the information read by the reading means.

In carrying out the invention and according to another aspect thereof, there is provided a recording/reproducing apparatus which uses a recording medium cassette having a recording medium, a cassette case for accommodating the recording medium, storage means for storing information about information recorded on the recording medium and information about the cassette itself, and a plurality of terminals for connecting the storage means with external equipment, the recording/reproducing apparatus being provided with a remote commander for remotely operating the recording/reproducing apparatus comprising a keyboard for performing the remote operation, a loading portion in which the recording medium cassette is loaded, a connector installed in the loading portion for being connected to the plurality of terminals, and reading means for reading the information from the storage means via the connector.

In carrying out the invention and according to still another aspect thereof, there is provided a recording/reproducing apparatus which uses a recording medium cassette having a recording medium, a cassette case for accommodating the recording medium, storage means for storing information about information recorded on the recording medium and information about the cassette itself, and a plurality of terminals for connecting the storage means to external equipment, the recording/reproducing apparatus comprising a linear skating tray on which the recording medium cassette is loaded, a connector provided on the linear skating tray and connected to the plurality of terminals, reading means for reading the information from the storage means via the connector, and display means for displaying the information read by the reading means.

By simply connecting the plurality of terminals of the recording medium cassette to the connector of the recording/reproducing apparatus allows recording information about the recording medium cassette to be displayed, thus providing information about recorded contents of the recording medium cassette quickly and easily as well as facilitating retrieval and management of the recorded contents.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE INVENTION

Figure 1:
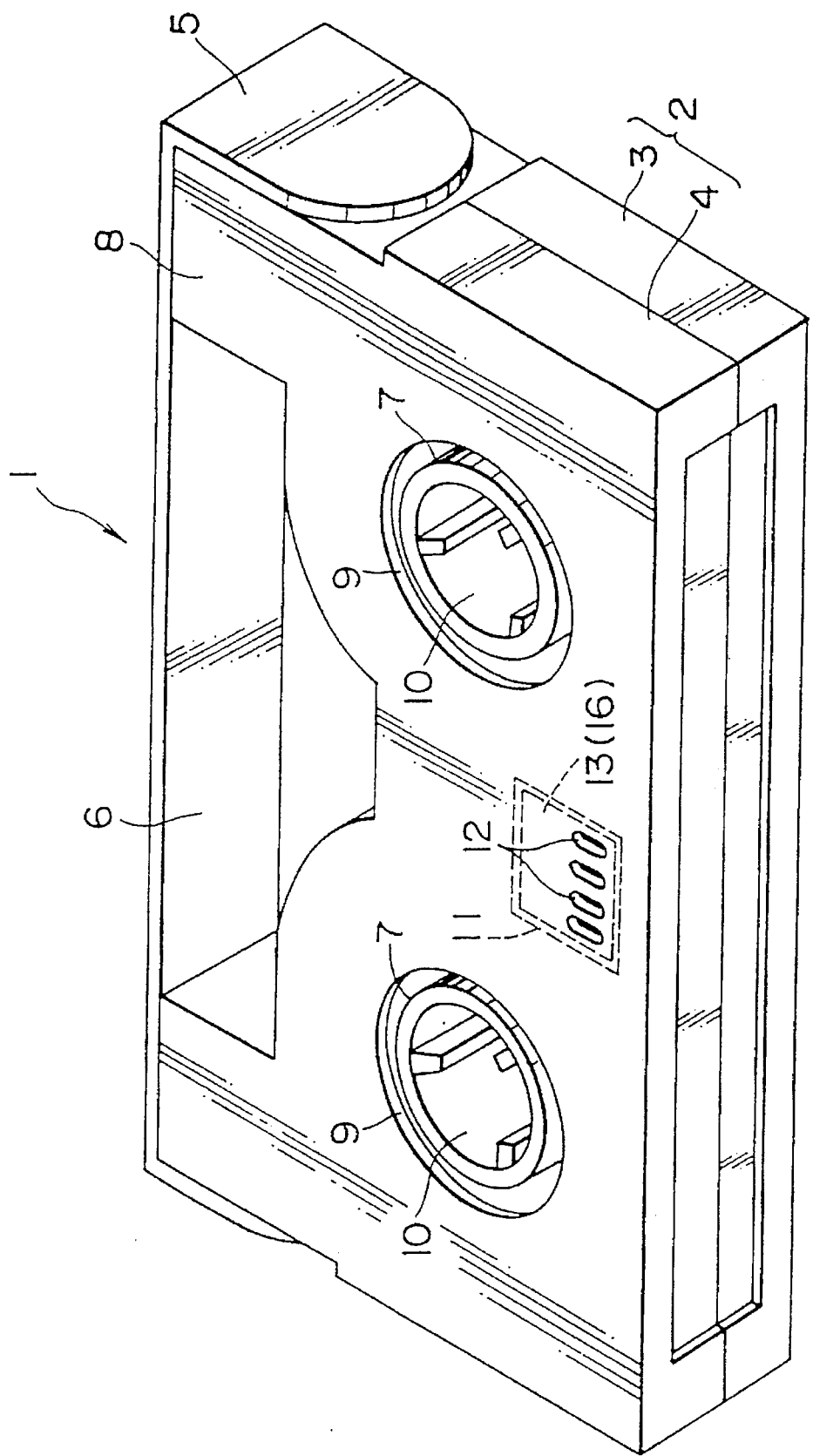
FIG. 1 is an overall perspective view of a recording medium cassette, with its bottom side up, suitable for use on a recording/reproducing apparatus in accordance with the present invention.

Referring to FIG. 1, a recording medium cassette 1 in accordance with the invention comprises a cassette case 2 having two rectangular, shallow shells, that is, an upper shell 3 and a lower shell 4, abutted together with their open sides inside. The cassette case 2 is attached with a lid 5 on its front side, providing a generally flat box in construction.

The lid 5 is pivotally supported on the cassette case 2 at each end thereof in a vertically swingable manner to allow access inside the cassette case. The lid opens to provide a mouth 6.

Inside the cassette case 2, a pair of tape reels 7 are rotatably accommodated with a magnetic tape, not shown, wound around them with each end fixedly secured on each reel. Each of the tape reels 7 is disposed against each of through-holes 9 spacedly formed on a bottom wall 8 of the cassette case 2 at right and left sides.

The tape reels 7 have reel hubs 10, each exposed to the outside of the cassette case through the through-holes 9, 9.

On the bottom wall 8, a generally rectangular, shallow recess 11 is formed at a side opposite to the mouth 6. The recess 11 is formed with a plurality of slit holes 12 (4 holes in an embodiment shown) each extending across the cassette case and disposed along it.

A printed circuit board that fits in the recess 11 may be a terminal board 13 or an IC board 16.

Figure 2:
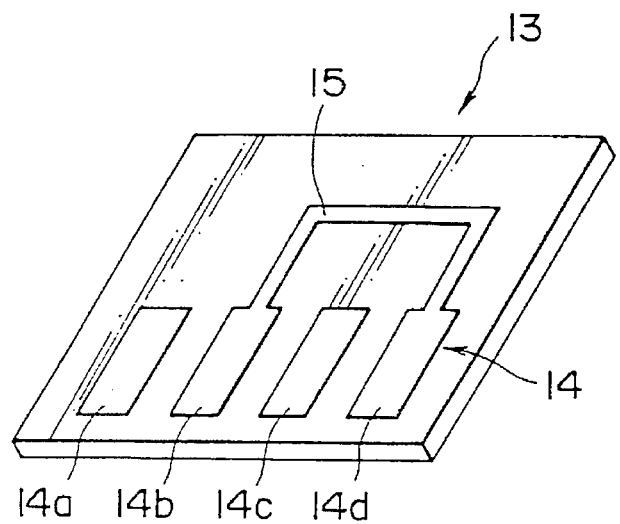
FIG. 2 is a perspective view of a terminal board, identifying means of the recording medium cassette of FIG. 1.

Referring to FIG. 2, the terminal board 13 having a terminal group 14 and conductor pattern 15 is formed rectangular so that it fits in the recess 11 in a generally tight manner.

The terminal group 14 has strip-shaped contacts 14a, 14b, 14c, and 14d spaced so that they correspond to the slit holes 12 (FIG. 1), respectively. It should be noted that these contacts are all gold-plated to enhance their durability and reliability.

The conductor pattern 15 varies depending on how the contacts 14a through 14d are arranged. With the embodiment shown, the pattern is so formed that the contact 14b and the contact 14d are connected, for example.

Figure 3:
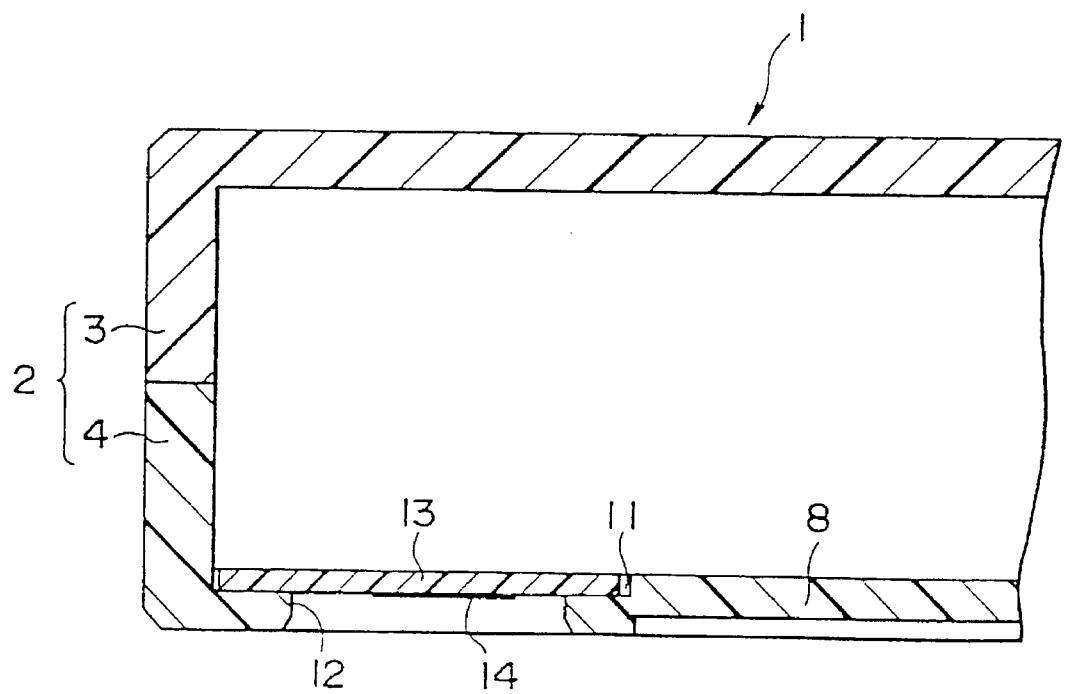
FIG. 3 is an enlarged, fragmentary sectional view of an essential portion of the terminal board as arranged in the cassette case of FIG. 1.

Referring to FIG. 3, the terminal board 13 constituted as mentioned above is fixedly secured in the recess 11 on the bottom wall 8 of the cassette case 2. To be more specific, the terminal board 13 fits in the recess 11 with the terminal group 14 down and the contacts 14a through 14d facing the slit holes 12 and is integrally fixed to the bottom wall 8 by means of adhesion or melting.

Figure 4:
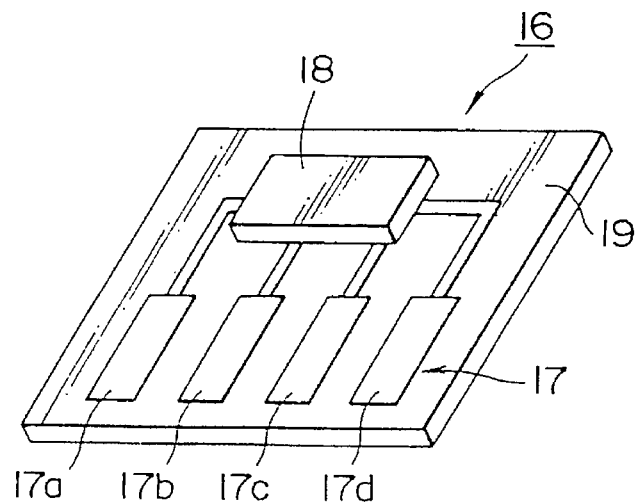
FIG. 4 is a perspective view of an IC board, identifying means in an preferred embodiment of the recording medium cassette of FIG. 1.

Now, referring to FIG. 4, the IC board 16 is provided with a terminal group 17 and an IC 18. As with the above-mentioned terminal board 13, the IC board is shaped and sized so that it fits the recess 11 on the bottom wall 8 of the cassette case 2 in a generally tight manner.

The terminal group 17 has strip-shaped contacts 17a through 17d aligned horizontally. The contacts 17a through 17d are spaced so that they correspond to the slit holes (FIG. 1) of the cassette case 2, respectively. It should be noted that these contacts are all gold-plated to enhance their durability and reliability.

The IC 18 is mounted on a board 19 and connected with the terminal group 17 via a conductor pattern. For example, the contact 17a is connected to a power supply terminal, the contact 17b to a signal input/output terminal, the contact 17c to a clock terminal, and the contact 17d to a GND terminal of the IC 18.

Figure 5:
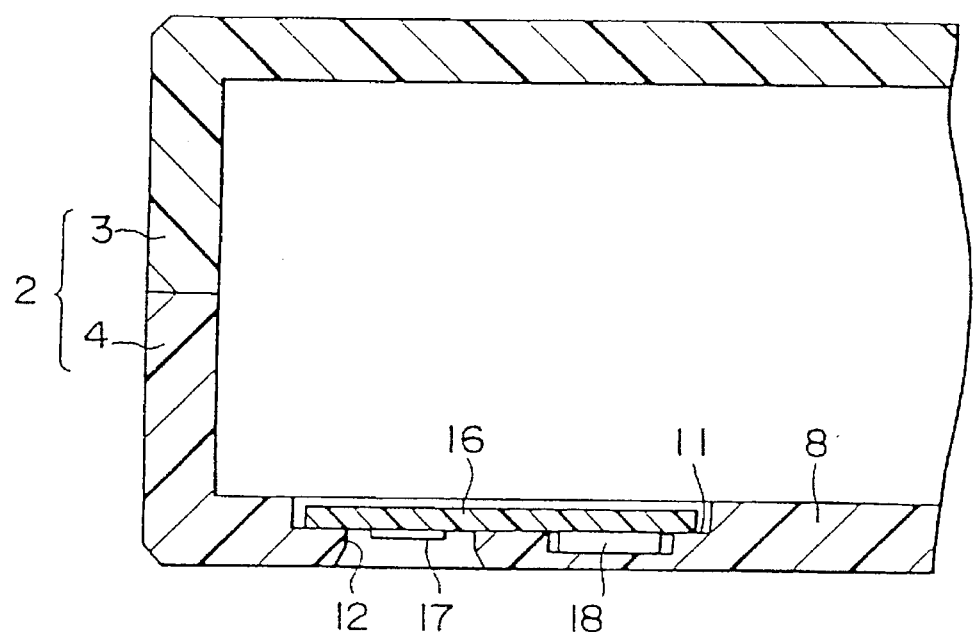
FIG. 5 is an enlarged, fragmentary sectional view of an essential portion of the IC board as arranged in the cassette case of FIG. 1.

Referring to FIG. 5, the IC board 16 constituted as mentioned above is fixedly secured in the recess 11 on the bottom wall 8 of the cassette case 2. To be more specific, the IC board 16 is mated with the recess 11 with the terminal group 17 and IC 18 down and the contacts 17a through 17d facing the slit holes 12 and is integrally fixed to the bottom wall 8 by means of adhesion or melting.

It should be noted that a press rib can be provided on the upper shell 3 so that it reaches down from the upper shell to press the terminal board 13 (or the IC board 16) at its upper side when the upper shell 3 and the lower shell 4 are coupled, thus fixing the terminal board 13 (or the IC board 16) onto the cassette case more securely.

Described below is a configuration and means for automatically discriminating between a terminal-type recording medium cassette obtained by mounting the terminal board 13 and an IC-type recording medium cassette obtained by mounting the IC board 16.

Figure 6:
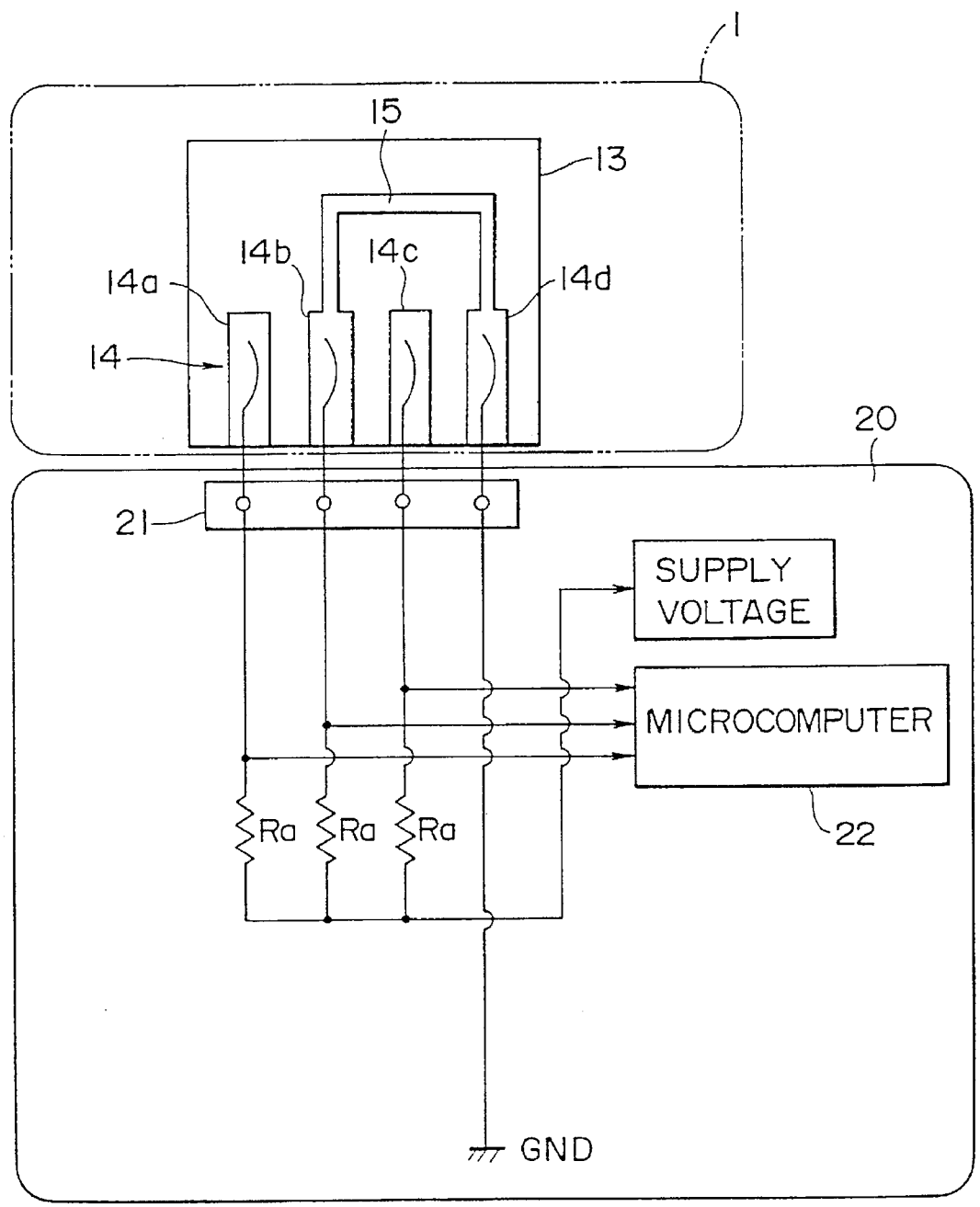
FIG. 6 is a block diagram illustrating a state of connection between the terminal board built in a cassette case and a recording/reproducing apparatus.

First, referring to FIG. 6 (and FIG. 2), the terminal-type recording medium cassette is arranged so that a supply voltage is applied via a resistor Ra to the contacts 14a, 14b, and 14c in contact with a connector 21 of a recording/reproducing apparatus 20 for example; from the contacts 14a, 14b, and 14c, a 3-bit signal is sent to a microcomputer; and the GND contact 14d is connected to GND.

With the above-mentioned embodiment, the conductor pattern is formed so that the supply voltage is applied to the connector 14a, 14b, and 14c, providing the 3-bit signal "High, Low, High" in this example. Thus, forming a pattern of connection between contacts 14a, 14b, 14c, and GND contact 14d as described allows eight 3-bit signals ranging from "Low, Low, Low" to "High, High, High" to be provided. This 3-bit recognition signal can be implemented with electrical combinations by means of the conductor pattern 15 instead of the conventionally practiced recognition holes.

Figure 7:
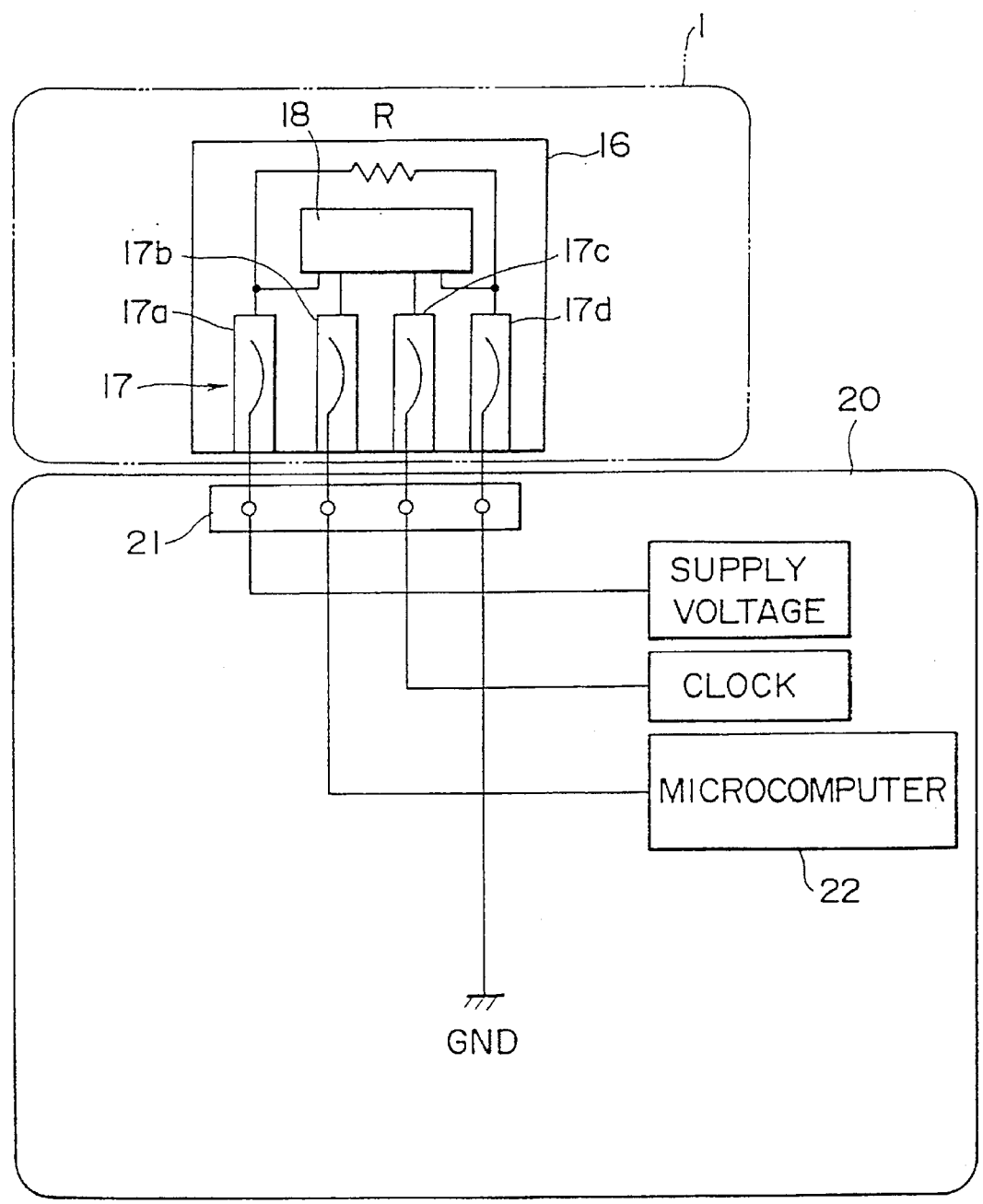
FIG. 7 is a block diagram illustrating a state of connection between the IC board built in a cassette case and a recording/reproducing apparatus.

Then, referring to FIG. 7 (and FIG. 4), the IC-type recording medium cassette comprises the terminal group 17, the IC 18, and a resistor R.

The terminal group 17 is connected to the connector 21 of the recording/reproducing apparatus 20 for data transmission. The terminal group 17 is made up of the power supply terminal 17a, the data input/output terminal 17b, the clock terminal 17c, and the GND terminal 17d. The power supply terminal 17a is connected to the IC 18 and the resistor R at one ends thereof. The data input/output terminal 17b and the clock terminal 17c are connected to the IC 18. The GND terminal 17d is connected to the IC 18 and the resistor R at the other ends thereof.

When the IC-type recording medium cassette constituted as mentioned above is put in a connected state with the recording/reproducing apparatus 20, the power is supplied to the IC 18 to make it ready for transferring data via the data input/output terminal 17b.

Although not shown, the IC 18 comprises a memory unit and a central processing unit (hereinafter referred to as a CPU). The memory unit is a so-called ROM/RAM which stores data coming from the CPU and outputs data at an address specified by the CPU.

In terms of internal structure, the memory unit consists of a common ID area and a user ID area, not shown. The common ID area contains such information about a tape as its type, thickness, grade, length, hub diameter, maker, country of production, recording format, and production date. It should be noted that the common ID area cannot be rewritten. The user area is used for recording such data as a recording time, recording date, and a program and can be rewritten as required. The CPU mainly functions to provide communication between the recording/reproducing apparatus 20 and the memory unit. Communication with the recording/reproducing apparatus 20 is carried out over the data input/output terminal 17b alone at a transfer rate of about 1 to 2 Mbps in serial transmission. The CPU also provides an interface capability for reading data from the memory unit to convert it into a serial data format before being output. Communication with the memory unit is carried out in parallel transmission. The parallel transmission is a general transmission mode determined by a data bus of the ROM/RAM used and is used in the embodiment to perform internal processing at a high speed.

The CPU operates on a clock signal entered via the clock terminal 17c. An operating speed of the CPU can be controlled by varying a frequency of the clock signal. Therefore, the data transfer rate can be increased by raising the frequency of the clock signal.

The resistor R is connected in parallel with the IC 18 to divide, together with a resistor $R_{101}$ (FIG. 8) to be described, the supply voltage applied by the recording/reproducing apparatus 20 via the power terminal 17a. Accordingly, the voltage at the power terminal 17a is set to a level of about half of the supply voltage Vcc.

Figure 8:
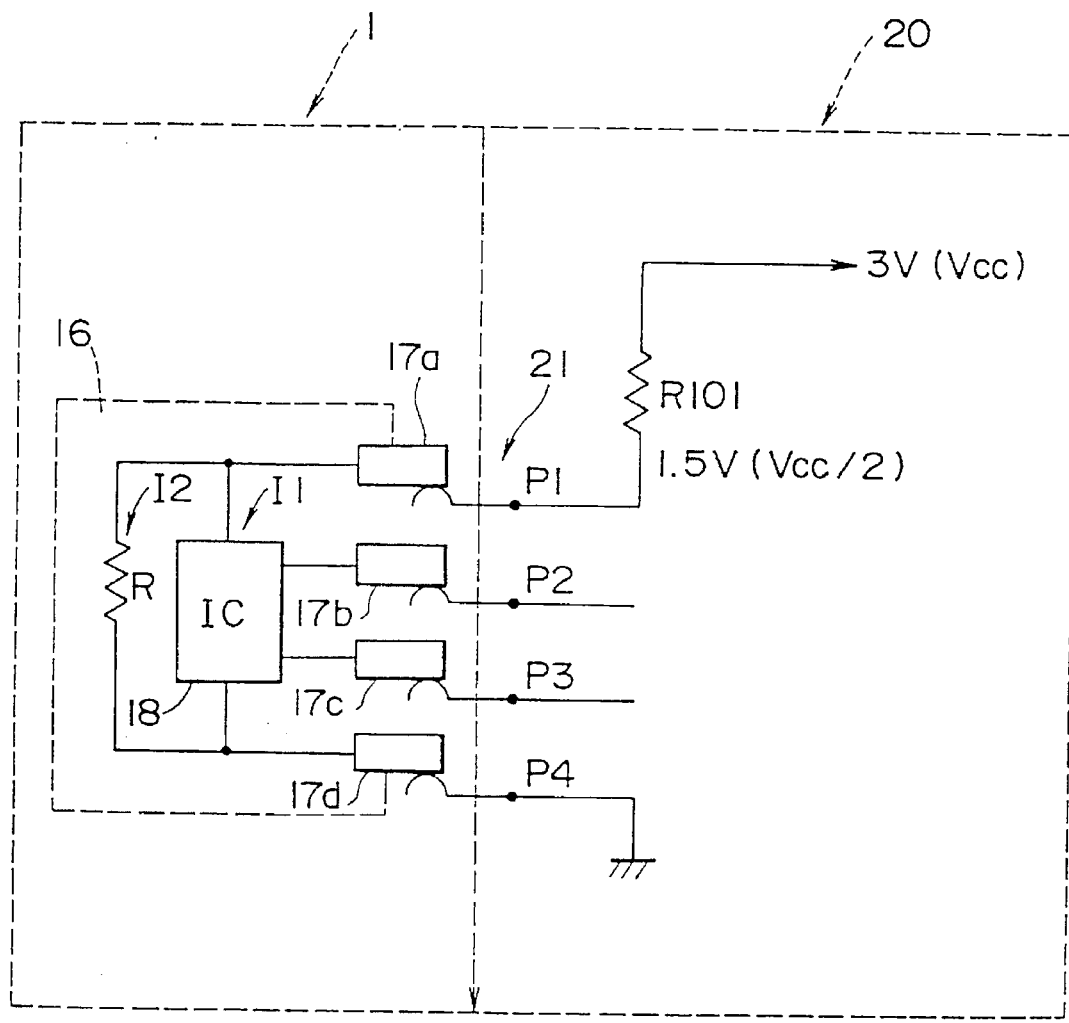
FIG. 8 is a block diagram illustrating a voltage setting at a time when the recording medium cassette suitable for use on the recording/reproducing apparatus in accordance with the invention is connected to the recording/reproducing apparatus.

For example, as shown in FIG. 8, let the supply voltage Vcc applied via the connector 21 of the recording/reproducing apparatus 20 be 3 V. The supply voltage Vcc is present between the resistor $R_{101}$ and a terminal P1 of the connector 21. While, a terminal P4 of the connector 21 is connected to GND. The IC board 16 is connected to the recording/reproducing apparatus 20 such that the power terminal 17a is pressed against the terminal P1 of the recording/reproducing apparatus 20 for connection and the GND terminal 17 d is pressed against the terminal P4 for connection.

A current supplied via the power terminal 17a flows to the IC 18 as a current I1 and to the resistor R as a current I2. Thus, to detect that the IC 18 is mounted on the board, the voltage at the power terminal 17a is set to a level of about half of the supply voltage Vcc, or about 1.5 V. To do so, values of the resistors R and $R_{101}$ are determined by following equations:

$$(I1+I2) \times R_{101} = 1.5 \ V \tag{1}$$

$$I2 \times R = 1.5 \ V \tag{2}$$

In equation (1), a value of the current I1 is predetermined by the IC 18 used. For example, if I1=3 mA, setting 6 mA to the current I2, by taking I2 ≧I1 into consideration for stabilization, then the resistor $R_{101}$=167 ohms from equation (1) and resistor R=250 ohms from equation (2). In a situation where the value of the current I1 is stable against the voltage 1.5 V, the resistor R may be removed from the embodiment.

Thus, with the IC-type recording medium cassette, it is necessary to set the resistors R and $R_{101}$ to values previously determined by the IC 18 and the supply voltage Vcc of the recording/reproducing apparatus 20.

A construction of a connector 21 provided on a remote commander main to be described or a cassette loading portion of the recording/reproducing apparatus will be described as follows.

Figure 9:
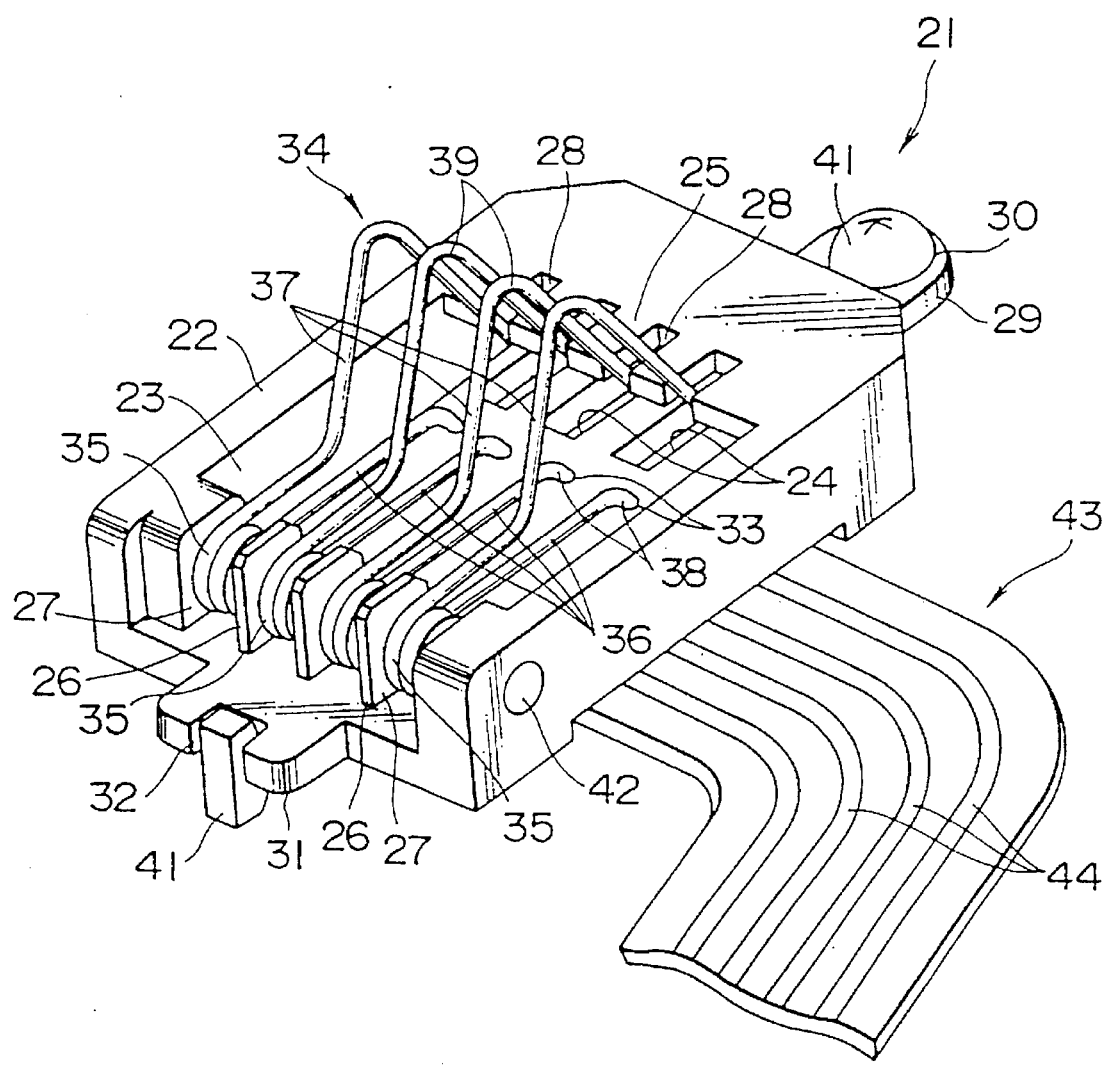
FIG. 9 is an enlarged perspective view of a connector in accordance with the invention.
Figure 10:
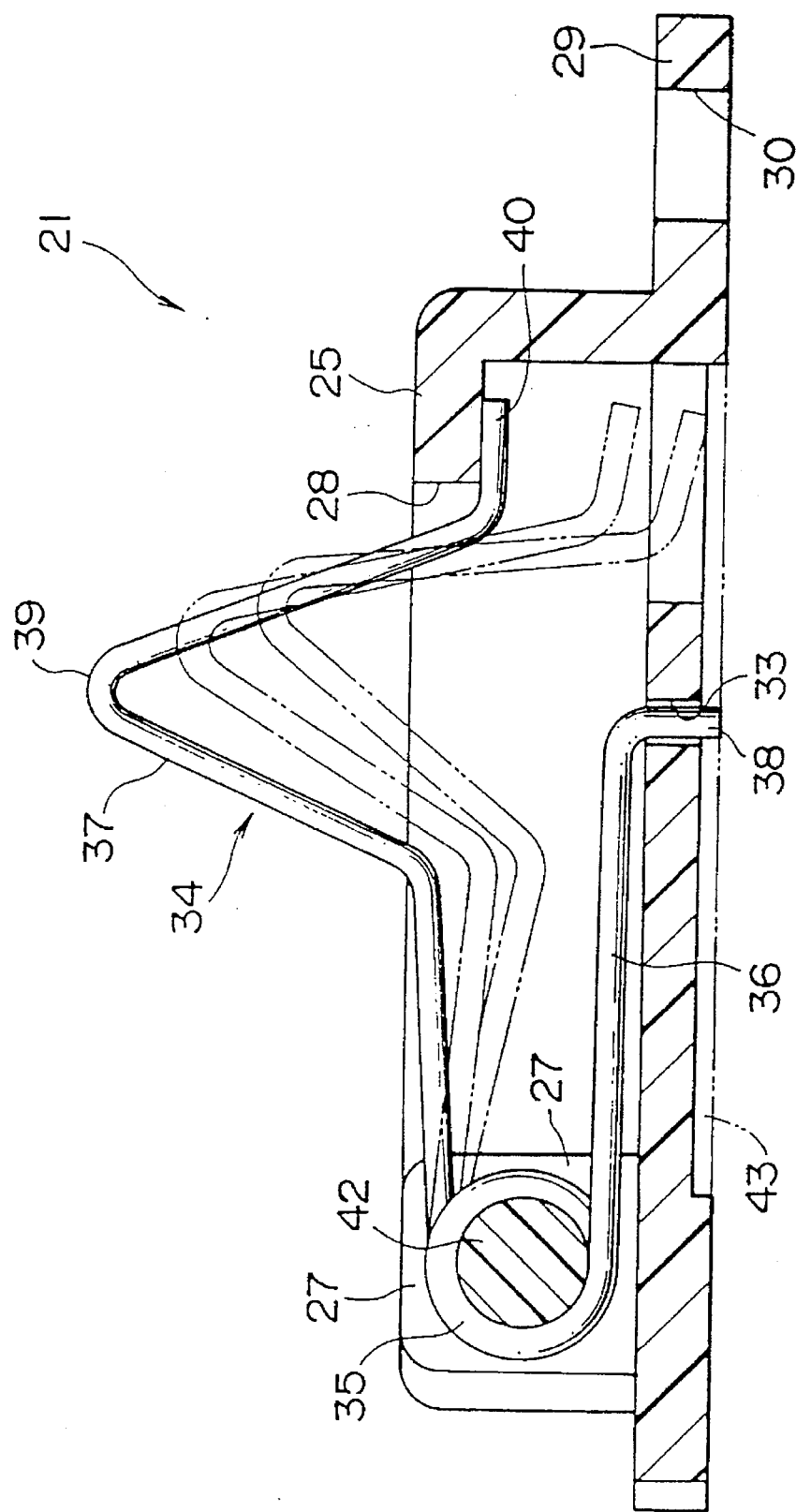
FIG. 10 is a sectional view along line A—A of FIG. 9.
Figure 11:
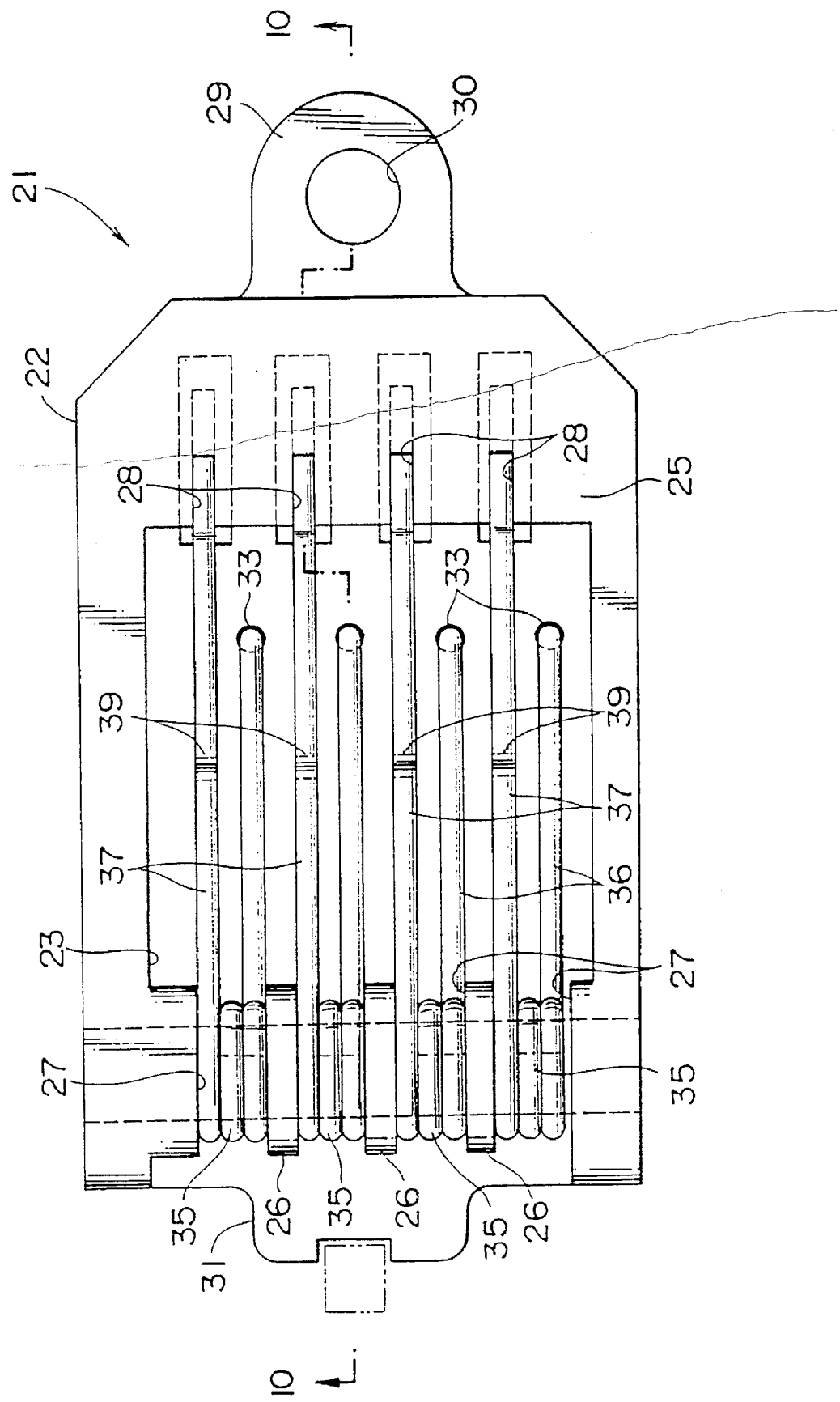
FIG. 11 is a top view of the connector of FIG. 9.

Referring to FIG. 9 through FIG. 11, the connector 21 comprises a casing 22, detecting terminal 34, a shaft 42 for supporting the detecting terminal 34 on the casing 22, and a flexible cable 43 connected with the casing 22 for transmitting a power and a signal.

The casing 22, made of such an insulating material as synthetic resin, is formed with an accommodating recess 23 on its upper surface opening upward and backward and an escape recess 24 on its lower surface at a location continuing to a front end of the accommodating recess 23. The escape recess 24 allows to form an overhang 25 at a location continuing to the front end of the accommodating recess 23.

Formed at a location opposite to the overhang 25 are support walls 26 aligned horizontally near a read stage of the accommodating recess 23. Between the support walls 26 and between the support walls 26 and right and left inner sides of the rear stage of the accommodating recess 23, support spaces 27 are provided at generally the same interval along the support walls.

The above-mentioned overhangs 25 corresponding to the support walls 26 are formed with a positioning recess 28 each.

At a location protruding forward from a middle along the front end of the casing 22, a mounting lug portion 29 is provided. The mounting lug portion 29 is formed with a mounting lug 30.

Opposite to the mounting lug portion 29, a positioning lug portion 31 is provided. The positioning lug portion 31 protrudes backward from a middle along the rear end of the casing 22. The positioning lug portion 31 is formed with a mating notch 32 opening toward its end.

Through-holes 33 are vertically formed on a bottom of the accommodating recess 23 of the casing 22 at generally a middle between the front and rear ends of the accommodating recess 23 and along an imaginary line connecting between each support space 27 and each overhang 25.

The detecting terminal 34, made of a conductive spring wire, is formed into a torsion coil spring 35 and then into a lower arm 36 and into an upper arm 37. The lower arm 36 is formed into a connecting portion 38 which bends downward at generally right angles and passes the through-hole 33 to connect to the flexible cable 43. The upper arm 37 is first formed upward into a contact portion 39 in a shape of an inverted letter V and then downward into a stopper 40 extending into the positioning recess 28.

In the casing 22 formed as mentioned above, the coils 35 of the detecting terminals 34 are disposed in the support spaces 27 respectively, with portions of the detecting terminals 34 other than the connecting portions 38 of the lower arms 35 arranged along the bottom of the accommodating recess 23 of the casing 22. A tip of the contact portion 39 of the upper arm 37 of the detecting terminal 34 is vertically movably in the positioning recess 28.

The above-mentioned connector 21 is fixed to the remote commander main or the loading portion of the recording/reproducing apparatus by mating the mating portion 32 of the positioning portion 31 with a positioning projection 41 provided on the remote commander main or the loading portion of the recording/reproducing apparatus and by screwing a screw 42 through the mounting lug 30 of the mounting portion 29.

The flexible cable 43 provides a wiring board connecting between the connector 21 and a circuit comprising a microcomputer and the like of the recording/reproducing apparatus 20. A conductor pattern 44 of the flexible cable 43 is connected to the connecting portions of the detecting terminal 34, respectively.

When the recording medium cassette 1 supported by a cassette holder, not shown, comes down in the cassette loading portion of the recording/reproducing apparatus or the remote commander main with the above-mentioned connector 21 fixedly secured at the predetermined location until engaging holes of the tape reels 3 are engaged with reel stages of the recording/reproducing apparatus, for example, the ends of the contact portions 39 of the casing 22 of the connector 21 come in contact with the terminal group 14 or terminal group 17 of the recording medium cassette 1 for connection, respectively.

When pressed by the lowering recording medium cassette 1, the upper arms 37 of the detecting terminal 34 are flexed resiliently downward, making the contact portions 39 move slightly forward to contact with the terminal group 14 of the terminal-type recording medium cassette or the terminal group 17 of the IC-type recording medium cassette. Thus, contact is securely made by spring force of the detecting terminals to avoid poor contact.

Described below is a communication circuit for automatically discriminating between the terminal-type recording medium cassette and the IC-type recording medium cassette, transferring data with the microcomputer based on a discrimination result, and displaying contents of recognition by the terminal-type recording medium cassette or information stored in the memory unit of the IC-type recording medium cassette.

Figure 12:
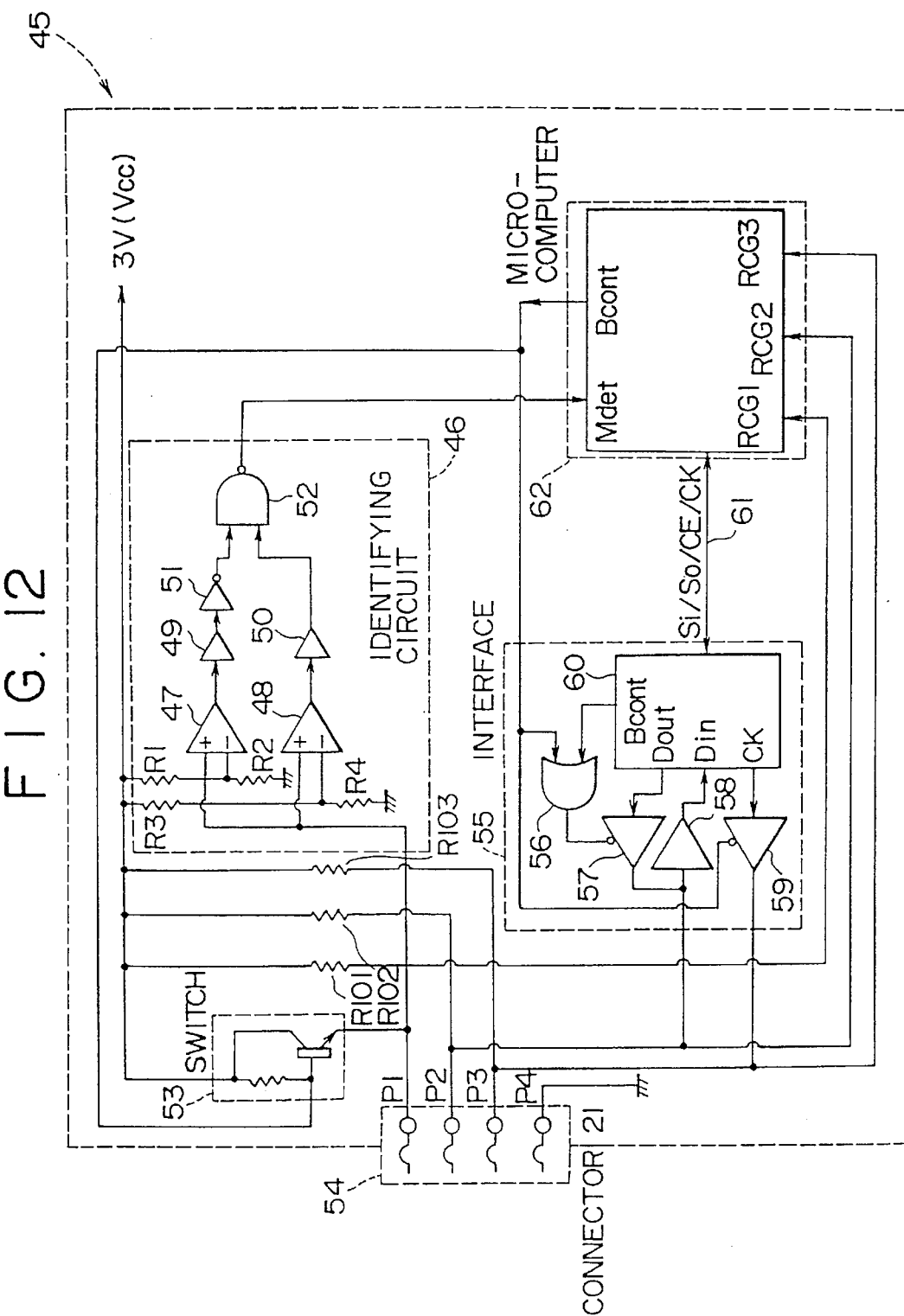
FIG. 12 is a diagram illustrating a communication circuit of the recording/reproducing apparatus in accordance with the invention.

Now, referring to FIG. 12, there is an example of a communication circuit 45 for reading the contents of recognition of the terminal-type recording medium cassette loaded in a recording/reproducing apparatus or the recording information of the IC-type recording medium cassette. A cassette identifying circuit 46 constituting the communication circuit 45 automatically determines, via the connector 21 (a terminal assembly 54) mounted on the recording/reproducing apparatus 20, whether an IC is installed on the recording medium cassette 1.

As shown in FIG. 12, the communication circuit 45 comprises the identifying circuit 46, resistors $R_{101}$, $R_{102}$, and $R_{103}$, a switch 53, the terminal assembly 54, an interface portion 55, and a microcomputer 62.

The supply voltage Vcc (3 V) is applied to one end of resistors R1 and R3 in the identifying circuit 46 respectively, one end of resistors $R_{101}$, $R_{102}$, and $R_{103}$ respectively, and a collector side of the switch 53.

The identifying circuit 46 comprises comparators 47 and 48, resistors R1, R2, R3, and R4, Schmitt triggers 49 and 50, an inverter 51, and a NAND gate 52.

A non-inverting input terminal of the comparator 47 (hereinafter referred to as a positive input terminal) is connected to a terminal P1 of the terminal assembly 54 and to a positive input terminal of the comparator 48. An inverting input terminal of the comparator 47 (hereinafter referred to as a negative input terminal) is connected to the other end of the resistor R1 and one end of the resistor R2. An output terminal of the comparator 47 is connected to an input terminal of the Schmitt trigger 49. The other end of the resistor R2 is connected to GND.

A positive input terminal of the comparator 48 is connected to the terminal P1 of the terminal assembly 54. A negative input terminal of the comparator 48 is connected to the other end of the resistor R3 and one end of the resistor R4. An output terminal of the comparator 48 is connected to an input terminal of the Schmitt trigger 50. The other end of the resistor R4 is connected to GND. It should be noted that the resistors R1 and R4 are set to a same resistance level; it holds true with the resistors R2 and R3. A ratio of resistance of R1 to that of R2 is 1 to 3, for example.

The Schmitt triggers 49 and 50 and the inverter 51 consists of single input and output terminals each. The input terminal of the Schmitt trigger 49 is connected to the output terminal of the comparator 47 and the output terminal is connected to an input terminal of the inverter 51. The input terminal of the Schmitt trigger 50 is connected to the output terminal of the comparator 48 and the output terminal is connected to an input terminal of the NAND gate 52. The input terminal of the inverter 51 is connected to the output terminal of the Schmitt trigger 49 and the output terminal is connected to the input terminal of the NAND gate 52. The NAND gate 52 consists of two input terminals and one output terminal. One of the input terminals is connected to the output terminal of the inverter 51 and the other input terminal to the output terminal of the Schmitt trigger 50. The output terminal of the NAND gate 52 is connected to an IC memory detecting terminal Mdet of the microcomputer 62.

The switch 53, a so-called switching element, is applied with the supply voltage Vcc at its collector. Its base is connected to a bus control terminal Bcont of the microcomputer 62. Its emitter is connected to the terminal P1 of the terminal assembly 54.

The terminal assembly 54 comprises terminals P1, P2, P3, and P4 adapted to come in contact with the terminal group 17 of the IC board 16 provided on the IC-type recording medium cassette or the terminal group 14 of the terminal board provided on the terminal-type recording medium cassette. The terminal assembly 54 is equivalent to the connector 21 described above by referring to FIGS. 9 and 10. The terminal P1 of the terminal assembly 54 is connected to the other end of the resistor $R_{101}$, the emitter of the switch 53, the positive input terminals of comparators 47 and 48, and a recognition terminal RCG1 of the microcomputer 62. The terminal P2 is connected to the other end of the resistor $R_{102}$, an output terminal of buffer 57 of the interface 55, an input terminal of buffer 58, and a recognition terminal RCG2 of the microcomputer 62. The terminal P3 is connected to the other end of the resistor $R_{103}$, an output terminal of buffer 59 of the interface 55, and a recognition terminal RCG3 of the microcomputer 62. The terminal P4 is connected to GND.

The interface 55 comprises an OR gate 56, the buffers 57, 58, and 59 and an interface circuit 60. The OR gate 56 consists of two input terminals and one output terminal, with one of the input terminals connected to the bus control terminal Bcont of the microcomputer 62, the other input terminal to a bus control terminal Bcont of the interface circuit 60, and the output terminal to an enable terminal of the buffer 57. The buffer 57 is provided with the enable terminal. Its input terminal is connected to a data-out terminal Dout of the interface circuit 60, the output terminal to the terminal P2 of the terminal assembly 54, and the enable terminal to the output terminal of the OR gate. The input terminal of the buffer 58 is connected to the output terminal of the buffer 57 and the terminal P2 of the terminal assembly 54 and an output terminal of the buffer 58 is connected to a data-in terminal Din of the interface circuit 60. The buffer 59 is provided with an enable terminal. Its input terminal is connected to a clock terminal CK of the interface circuit 60, the output terminal to the terminal P3 of the terminal assembly 54 and the recognition terminal RCG3 of the microcomputer 62, and the enable terminal to the bus control terminal Bcont of the microcomputer 62. The bus control terminal Bcont of the interface circuit 60 is connected to the other input terminal of the OR gate 56, the data-out terminal Dout to the input terminal of the buffer 57, the data-in terminal Din to the output terminal of the buffer 58, and the clock terminal CK to the input terminal of the buffer 59.

The interface circuit 60 is connected to the microcomputer 62 via an internal bus 61. The internal bus 61 comprises a serial data-in Si, a serial data-out So, a chip select CE, and the clock CK. The microcomputer 62 has the bus control terminal Bcont, the IC memory detecting terminal Mdet, and the recognition terminals RCG1, RCG2, and RCG3. The bus control terminal Bcont is connected to the base of the switch 53, one input terminal of the OR gate 56 of the interface 55, and the enable terminal of the buffer 59. The IC memory detecting terminal Mdet is connected to the output terminal of the NAND gate 52 of the identifying circuit 46, the recognition terminal RCG1 to the terminal P1 of the terminal assembly 54, the recognition terminal RCG2 to the terminal P2 of the terminal assembly 54, and the recognition terminal RCG3 to the terminal P3 of the terminal assembly 54.

Described below is a method of communication to be performed with a terminal-type recording medium cassette or an IC-type recording medium cassette loaded in a recording/reproducing apparatus provided with the communication circuit 45 having the above-mentioned constitution.

For example, when the recording medium cassette 1 is loaded into the recording/reproducing apparatus, the communication circuit first checks the loaded cassette for an IC. This check is achieved by reading the voltage value as described above by referring to FIG. 8. This operation is performed upon completion of connection between the connector 21 (equivalent to the terminal assembly 54 of FIG. 12) installed on the recording/reproducing apparatus and the terminal group 14 (or 17) provided on the recording medium cassette 1. That is, when the voltage at the terminal P1 of the terminal assembly 54 of the communication circuit 45 becomes 0 V or 3 V it indicates the terminal-type recording medium cassette provided with the terminal board 13; and when the voltage becomes about half (1.5 V) of the supply voltage Vcc (3 V) it indicates the IC-type recording medium cassette is provided with the IC board 16. The voltage at the terminal P1 of the terminal assembly 54 is determined by the resistor R described above by referring to FIG. 8 and the resistor $R_{101}$ of the communication circuit 45.

Next, how the communication circuit 45 operates will be described in detail for the terminal-type recording medium cassette and the IC-type recording medium cassette.

(1) The terminal-type recording medium cassette

The communication circuit 45 detects that the terminal-type recording cassette has been loaded in the recording/reproducing apparatus. That is, the recognition output terminal 14a of the terminal board 13 of FIG. 6 is pressed against the terminal P1 of the terminal assembly 54 of the communication circuit 45 of FIG. 12, the recognition output terminal 14b against the terminal P2 of the terminal assembly 54, the recognition output terminal 14c against the terminal P3 of the terminal assembly 54, and the GND terminal 14d against the terminal P4 of the terminal assembly 54 for connection.

At this time, the recognition output terminal 14a is open and the switch 53 is off, so that the potential at the terminal P1 of the terminal assembly 54 is equal to the supply voltage Vcc (3 V); if the recognition output terminal 14a is connected to GND, the potential at the terminal P1 of the terminal assembly 54 is about 0 V. This 3 V or 0 V is applied to the positive input terminals of the comparators 47 and 48. If the potential of its positive input terminal is 3 V, the comparator 47 operates to make its output terminal high. If the potential of its positive input terminal is 3 V, the comparator 48 operates to make its output terminal high. However, this state does not satisfy an input condition of the NAND gate 52.

On the other hand, if the potentials at the positive input terminals of the comparators 47 and 48 are both about 0 V, low-level signals appear at the output terminals of both the comparators. Still, this state does not satisfy the input condition of the NAND gate 52.

A state to satisfy the input condition of the NAND gate 52 is that the comparator 47 outputs a low-level signal while the comparator 48 outputs a high-level signal. That is, resistances of the resistors are determined so that the comparator 47 does not operate and the comparator 48 operates when voltages obtained by dividing the supply voltage Vcc by the resistors R1, R2, R3, and R4 (R1=R4, R2=R3) are applied to the negative input terminals of the comparators 47 and 48, and the potential of the terminal P1 of the terminal assembly 54 is about 1.5 V. Therefore, if the potential of the terminal P1 of the terminal assembly 54 is either about 3 V or 0 V, the input condition for the NAND gate 52 is not satisfied and the output terminal of the NAND gate remains high, so that the IC memory detecting terminal Mdet of the microcomputer 62 is high.

When the memory detecting terminal Mdet is high, the bus control terminal Bcont of the microcomputer 62 remains low to inhibit the operation of the interface 55 and to hold the switch 53 off and, consequently, the supply voltage Vcc is applied through the resistor $R_{101}$ to the terminal P1 of the terminal assembly 54. The microcomputer 62 receives the recognition signal provided at the recognition output terminal 17a of the terminal board 16 through the terminal P1 at the recognition terminal RCG1, the recognition signal provided at the recognition output terminal 17b through the terminal P2 at the recognition terminal RCG2, and the recognition signal provided at the recognition output terminal 17c through the terminal P3 at the recognition terminal RCG3, thereby identifying the recording medium cassette 1. Thus, the microcomputer 62 receives the recognition signals representing information about the recording medium cassette 1 including the type and thickness of the magnetic tape of the recording medium cassette 1.

(2) IC-type recording medium cassette

The communication circuit 45 identifies the IC-type recording medium cassette when the IC-type recording cassette is loaded into the recording/reproducing apparatus. When the IC-type recording medium cassette 1 is loaded into the recording/reproducing apparatus, the power supply terminal 17a, the data input/output terminal 17b, the clock terminal 17c, and the GND terminal 17d are pressed against the terminals P1, P2, P3, and P4, respectively, for connection.

As described above with reference to FIG. 8, the power supply terminal 17a is connected through the IC chip 18 and the resistor R to the GND terminal 17d. The resistance of the resistor R of the IC board 16 is determined so that the potential of the terminal P1 of the terminal assembly 54 is about 1.5 V (about Vcc/2) through the resistor $R_{101}$ when the IC board 16 is connected to the communication circuit 45. Accordingly, when the IC board 16 of the IC-type recording medium cassette is connected to the communication circuit 45, a voltage of about 1.5 V appears at the terminal P1 of the terminal assembly 54 to apply a voltage of about 1.5 V to the positive input terminals of the comparators 47 and 48 of the identifying circuit 46, the output terminal of the comparator 47 goes low, and the output terminal of the comparator 48 goes high. Consequently, the input condition for the NAND gate 52 is satisfied and the IC memory detecting terminal Mdet of the microcomputer 62 goes low.

When the IC memory detecting terminal Mdet of the microcomputer 62 goes low, the bus control terminal Bcont goes high, the switch 53 turns on to apply the supply voltage Vcc (3 V) to the terminal P1 of the terminal assembly 54. Consequently, the supply voltage Vcc (3 V) is applied to the IC chip 18 of the IC board 16 to make the IC chip 18 ready for operation.

Meanwhile, the OR gate 56 of the interface 55 enables the buffers 57 and 59 when the bus control terminal Bcont of the microcomputer 62 goes high to send a clock signal through the clock terminal CK of the interface circuit 60 and the terminal P3 of the terminal assembly 54 to the IC chip 18 of the IC board 16. Then, the IC chip 18 can communicate with the recording/reproducing apparatus.

The microcomputer 62 of the communication circuit 45 sends command signals requiring sending data through the interface 55 to the IC chip 18 of the IC board 16, and then the IC chip 18 sends data through the terminal P2 of the terminal assembly 54 to the microcomputer 62 in synchronization with the above-mentioned clock signal.

When recording data on the IC chip 18 of the IC board 16 of the IC-type recording medium cassette, the microcomputer 62 sends a command signal requesting a recording operation through the interface 55 to record the data sent through the terminal P2 of the terminal assembly 54 in synchronization with the above-mentioned clock signal.

More concretely, if data has been recorded on the IC chip 18 of the IC board 16 of the IC-type recording medium cassette, the microcomputer 62 reads the data from the IC chip 18 and determines a category of the IC-type recording medium cassette, such as a rental recording medium cassette or a recording medium cassette holding data, on the basis of the data. If the recording medium cassette has not recorded any data, the IC chip 18 records information about the recording medium cassette including the length of the tape of the recording medium cassette, the available capacity of the recording medium cassette, the amount of data recorded, and the time and date of recording in a predetermined sequence.

Described below is means for reading cassette information from the recording medium cassette 1 provided with the terminal group 14 of the terminal board 13 or the terminal group 17 of the IC board 16 and displaying the read information. The information reading means is implemented by using a remote commander or by connecting the recording medium cassette 1 to a linear skating tray of the recording/reproducing apparatus.

(1) Reading recording information by the remote commander

Figure 13:
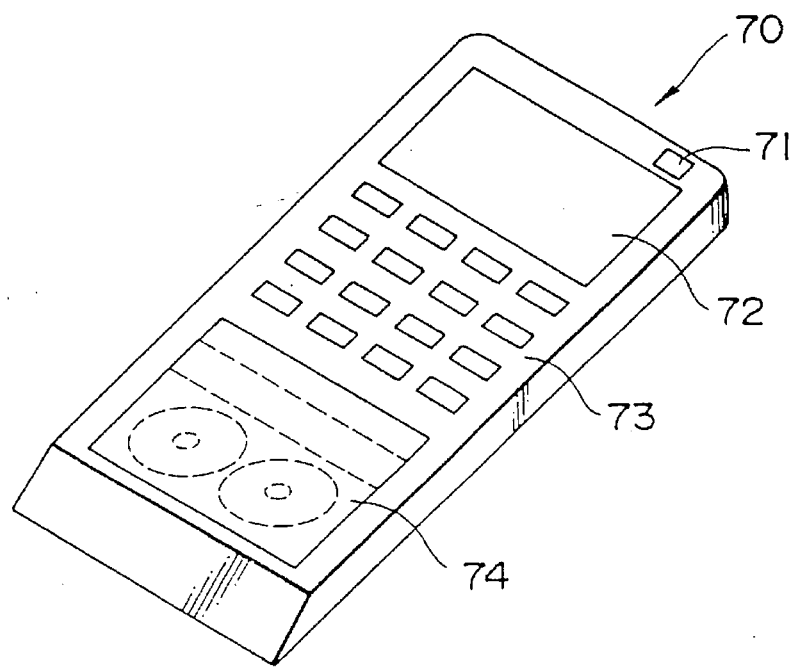
FIG. 13 is a diagram illustrating a state in which a remote commander in accordance with the invention is connected to a magnetic recording medium cassette.
Figure 14:
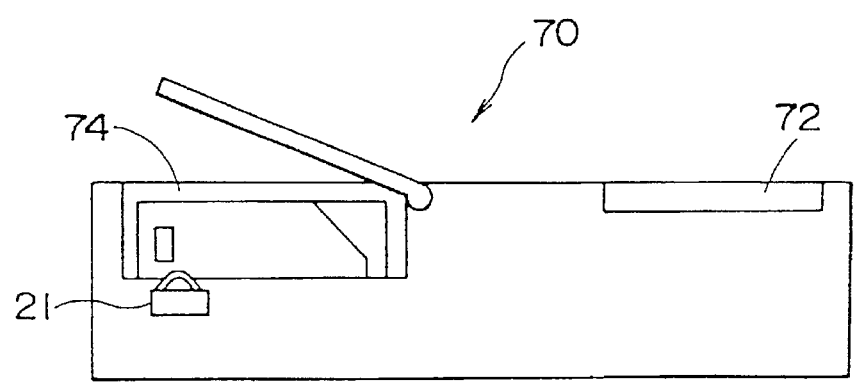
FIG. 14 is a sectional view of the remote commander of FIG. 13.

Referring to FIGS. 13 and 14, a remote commander main 70 is a rectangular box externally. On its front side, the commander has display light 71 which goes on when sending upward, a remote commander display 72 formed by an LCD for example for displaying recording information, controls 73, and a cassette loading portion 74 provided with the connector 21 (FIGS. 9 and 10) for reading the recording information via the terminal group 14 (or 17) provided on the recording medium cassette 1. The remote commander thus constituted incorporates the above-mentioned communication circuit 45, allowing it to read data from the IC memory built in the recording medium cassette or the recognition information obtained by the terminal board and display a read result. If only one of the IC-type recording medium cassette and the terminal-type recording medium cassette is used, the above-mentioned communication circuit can be simplified. That is, the communication circuit does not require the identifying circuit 46 any longer. If only the terminal-type recording medium cassette is used, the interface 55 is not required. If only the IC-type recording medium cassette is used, the recognition terminals RCG1 through RCG3 of the microcomputer 62 are not required.

When reading recording information by the remote commander constituted as mentioned above, the recording medium cassette 1 is loaded into the remote commander main 70 to read recording information and display it on the remote commander display 72, allowing visual checking of contents of the information. The remote commander main 70 is so constituted that only the recording information of the terminal-type recording medium cassette or the IC-type recording medium cassette is obtained without loading a recorded magnetic tape from the recording medium cassette 1, the remote commander main 70, even if of a hand-held type, can easily accommodate the cassette loading portion 74.

Figure 15:
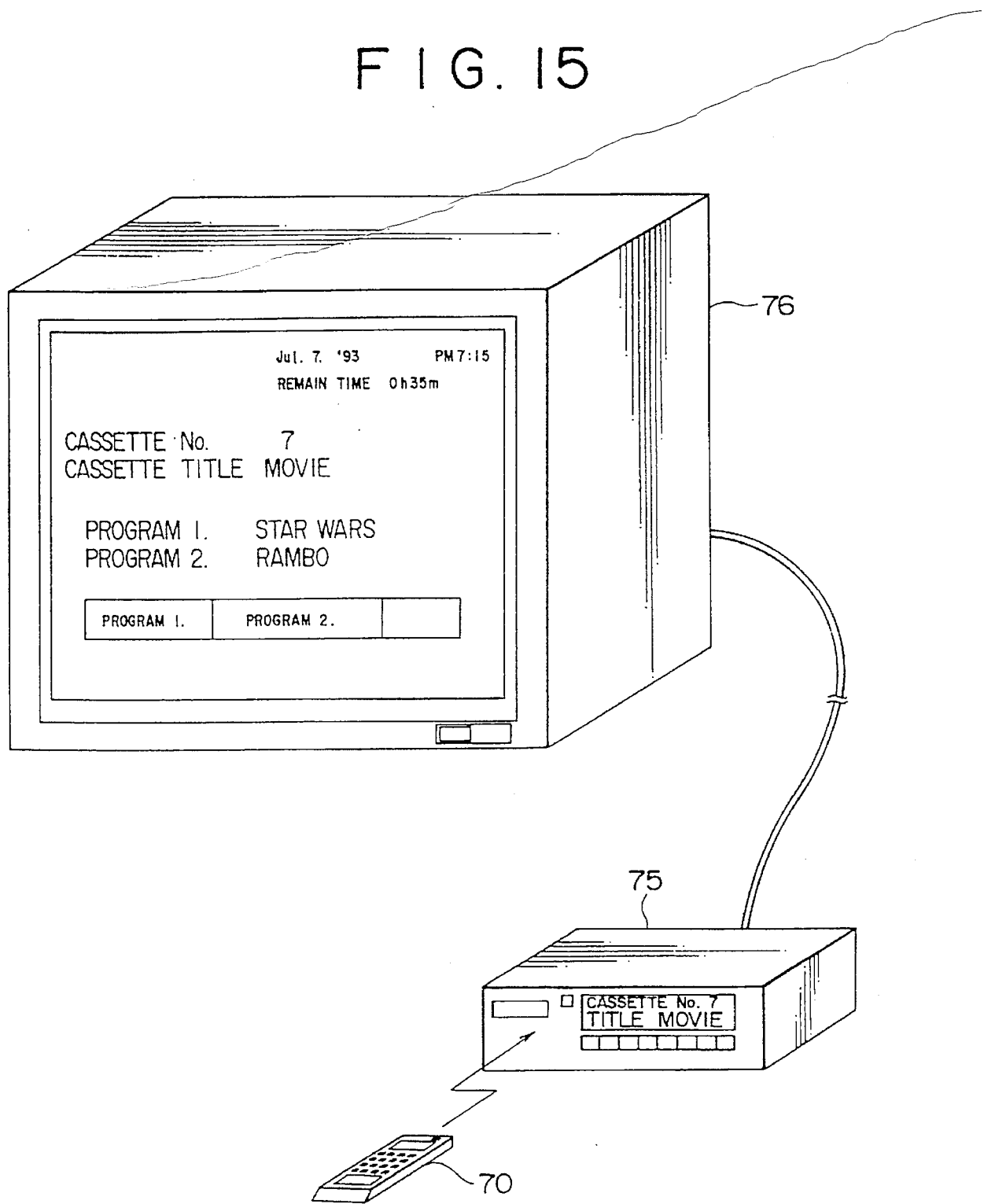
FIG. 15 is a diagram illustrating a state in which information read by the remote commander is transferred to the recording/reproducing apparatus.

Further, as shown in FIG. 15, recording information stored in the IC memory is read by the communication circuit 45 built in the remote commander. The read information can be sent to a recording/reproducing apparatus 75 to display it on the apparatus 75. If the recording/reproducing apparatus has no display unit, the information can be displayed on a television set or a monitor connected to the apparatus.

Figure 16:
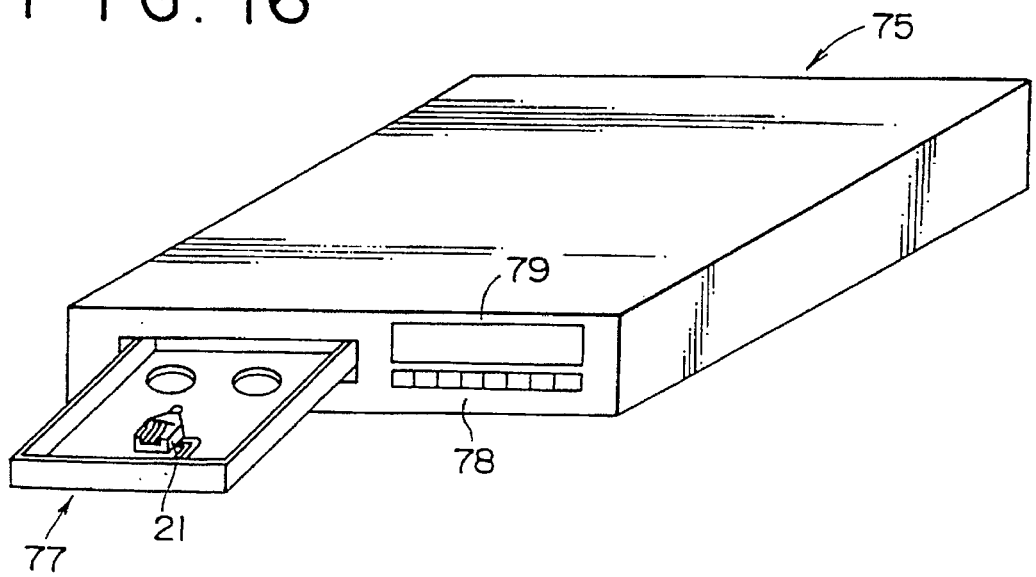
FIG. 16 is a diagram illustrating a state in which a linear skating tray provided on the recording/reproducing apparatus is drawn out.
Figure 17:
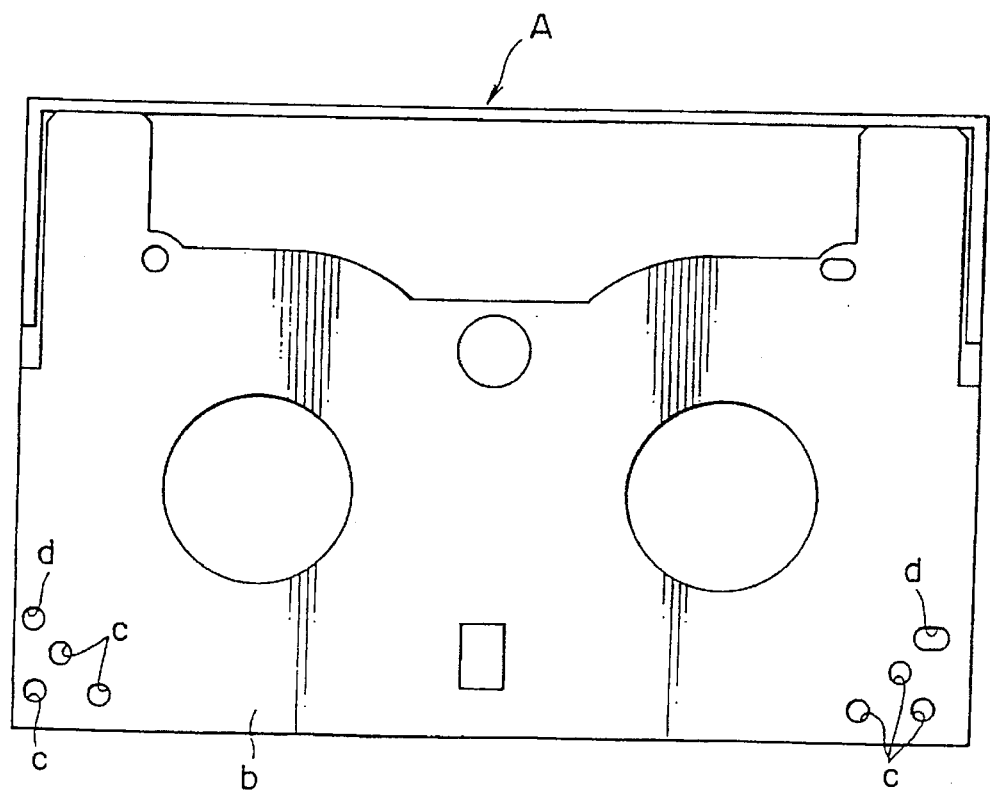
FIG. 17 is a diagram illustrating a bottom side of a prior-art recording medium cassette.

(2) Reading recording information by drawing out a linear skating tray of recording/reproducing apparatus When reading recording information by drawing out the linear skating tray of the recording/reproducing apparatus, a linear skating tray 77 provided on the recording/reproducing apparatus 75 is drawn out as shown in FIG. 16 and the recording medium cassette 1 is loaded onto the tray left drawn out. The linear skating tray 77 automatically opens or closes so that the recording medium cassette 1 can be loaded onto it.

When the connector 21 provided on the linear skating tray 77 comes in contact with the terminal group 14 of the terminal board 13 of the terminal-type recording medium cassette or the terminal group 17 of the IC board 16 of the IC-type recording medium cassette, the recording information can be read without having to load the magnetic tape from the recording medium cassette 1.

Thus, loading the recording medium cassette 1 onto the linear skating tray 77 drawn out allows to display the recording information easily and quickly. The recording information can be displayed on the display panel 79 provided on the recording/reproducing apparatus 75 along with controls 78. Alternatively, the recording information can be displayed on a television set or a monitor connected to the recording/reproducing apparatus.

As described above, the methods of displaying the recording information of the recording medium cassette according to the present invention and the recording/reproducing apparatus for such a recording medium cassette are advantageous over the prior art in that only connecting the plurality of terminals of the recording medium cassette with the connector of the recording/reproducing apparatus allows to quickly and easily retrieve and visually check the recording information such as type, thickness, and length of the magnetic tape, and the category of the cassette whether it has been recorded, it is for rent, or the like without loading the magnetic tape from the recording medium cassette. Additionally, the recording information of the recording medium cassette can be displayed on the remote commander, recording/reproducing apparatus, and the like to facilitate operations for obtaining the recording information and quickly and easily retrieve and visually check it even if there are lots of magnetic recording medium cassettes to be processed, making their management remarkably easy.

While preferred embodiments of the invention have been described using specific terms, such description is for illustrative purpose only, and it is to be understood that changes and variations may be made without departing from the spirit or scope of the appended claims.

What is claimed is:

1. A display apparatus adapted for use with first and second types of recording medium cassettes each buying a recording medium, a cassette case for accommodating said recording medium, and a plurality of terminals, said first type of recording medium cassette further having storage means for storing cassette information and said second type of recording medium cassette further having terminal means having a respective conductor pattern which connects selected one or ones of the terminals of said second type of recording medium together so as to provide said cassette information without utilizing an integrated-circuit memory chip, said cassette information including at least one of information pertaining to information recorded on a respective recording medium and information about a respective recording medium cassette itself, said display apparatus comprising:

a loading portion for loading the respective recording medium cassette;

a connector provided on said loading portion to be connected with a respective plurality of terminals;

reading means for reading the cassette information from said storage means through said connector when said first type of recording medium cassette is being-used with said display apparatus and for reading the cassette information from said terminal means through said connector based on a difference in electrical values associated with the respective conductor pattern when said second type of recording medium cassette is being used with said display apparatus; and display means for displaying the cassette information read by the reading means.

2. A display apparatus as in claim 1, wherein said storage means includes an integrated-circuit memory chip.

3. A display apparatus as in claim 2, wherein the recording medium of said first and second types of recording medium cassettes is a magnetic tape.

4. A recording/reproducing apparatus for recording or reproducing information for use with first and second types of recording medium cassettes each having a recording medium, a cassette case for accommodating said recording medium, and a plurality of terminals, said first type of recording medium cassette further having storage means for storing cassette information and said second type of recording medium cassette further having terminal means having a respective conductor pattern which connects selected one or ones of the terminals of said second type of recording medium cassette together so as to provide said cassette information without utilizing an integrated-circuit memory chip, said cassette information including at least one of information pertaining to the information recorded on a respective recording medium and information about a respective recording medium cassette itself, said recording/reproducing apparatus provided with a remote commander for remotely operating said recording/reproducing apparatus, said remote commander comprising:

at least one operator key for activating the remote operation;

a loading portion for loading the respective recording medium cassette;

a connector provided on said loading portion to be connected to a respective plurality of terminals; and reading means for reading the cassette information from said storage means through said connector when said first type of recording medium cassette is being used with said remote commander and for reading the cassette information from said terminal means through said connector based on a difference in electrical values associated with the respective conductor pattern when said second type of recording medium cassette is being used with said remote commander.

5. A recording/reproducing apparatus as in claim 4, wherein said storage means includes an integrated-circuit memory chip.

6. A recording/reproducing apparatus as in claim 4, wherein the recording medium of said first and second types of recording medium cassettes is a magnetic tape.

7. A recording/reproducing apparatus as in claim 4, wherein said remote commander further comprises display means for displaying the cassette information read by said reading means.

8. A recording/reproducing apparatus as in claim 4, wherein said recording/reproducing apparatus has display means for displaying the cassette information transferred from said reading means.

9. A recording/reproducing apparatus for recording or reproducing information for use with first and second types of recording medium cassettes each having a recording medium, a cassette case for accommodating said recording medium, and a plurality of terminals, said first type of recording medium cassette further having storage means for storing cassette information and said second type of recording medium cassette further having terminal means having a respective conductor pattern which connects selected one or ones of the terminals of said second type of recording medium cassette together so as to provide said cassette information without utilizing an integrated-circuit memory chip, said cassette information including at least one of information pertaining to the information recorded on a respective recording medium and information about a respective recording medium cassette itself, said recording/reproducing apparatus comprising:

a linear skating tray for loading the respective recording medium cassette;

a connector provided on said linear skating tray to be connected to a respective plurality of terminals;

reading means for reading the cassette information from said storage means through said connector when said first type of recording medium cassette is being used with said apparatus and for reading the cassette information from said terminal means through said connector based on a difference in electrical values associated with the respective conductor pattern when said second type of recording medium cassette is being used with said apparatus; and display means for displaying the cassette information read by the reading means.

10. A recording/reproducing apparatus as in claim 9, wherein the recording medium of said first and second types of recording medium cassettes is a magnetic tape.

11. A recording/reproducing apparatus as in claim 10, wherein the cassette information stored in said storage means is read by said reading means before the magnetic tape of said first type of recording medium cassette is loaded.

* * * * *